United States Patent [19]

Powers et al.

[11] 4,374,185
[45] Feb. 15, 1983

[54] HIGH TEMPERATURE, HIGH PRESSURE CHEMICAL RESISTANT SEAL MATERIAL

[75] Inventors: Joseph Powers, Riverside; John C. Trocciola, Glastonbury, both of Conn.; Ronald G. Martin, Monson, Mass.

[73] Assignee: United Technologies Corporation, Hartford, Conn.

[21] Appl. No.: 263,660

[22] Filed: May 14, 1981

[51] Int. Cl.³ .............................................. H01M 2/08
[52] U.S. Cl. ......................................... 429/36; 429/46
[58] Field of Search ....................... 429/36, 46, 35, 34, 429/174, 185; 260/38.8 F, 42.27

[56] References Cited

U.S. PATENT DOCUMENTS 3,979,224  9/1976  Strasser ............................. 429/36 X
4,259,389  3/1981  Vine et al. ......................... 429/36 X
4,269,642  5/1981  De Casperis et al. ............. 429/36 X Primary Examiner—Anthony Skapars
Attorney, Agent, or Firm—Harry J. Gwinnell

[57] ABSTRACT

A seal material especially adapted for phosphoric acid fuel cell stack sealing is described comprising an unfilled, unoiled high molecular weight polytetrafluoroethylene. Although the seal material is especially adapted as the regular seal around the plenums separating the oxygen and hydrogen gas inlets and outlets, it can also be used as a plenum or stack crack sealer. The material provides seal integrity and stability at temperatures in excess of 400° F. (204° C.), e.g. 400° F. to 450° F. (204° C. to 232° C.), in a corrosive chemical environment at differential pressures above 50 psi (e.g. 50 psi to 80 psi). It can be used in electrochemical cells in general where high temperature, high pressure, corrosive environments prevail.

3 Claims, 2 Drawing Figures

HIGH TEMPERATURE, HIGH PRESSURE CHEMICAL RESISTANT SEAL MATERIAL

DESCRIPTION

1. Technical Field

The field of art to which this invention pertains is seal material and specifically seal material for high temperature and pressure, corrosive environment use.

2. Background Art

A phosphoric acid fuel cell stack is formed from a plurality of generally flat, rectangular shaped fuel cells stacked one upon another. The cells use phosphoric acid as the electrolyte and may reach temperatures in excess of 400° F. (204° C.). The fuel or oxidant may be fed into each of the cells in the stack through openings in the sides of the stack by means of a manifold or plenum which covers at least a portion of the side of the stack and which must be sealed around the edges thereof against the surface of the stack to prevent leaking of the reactant gases. The surface of the stack against which the manifold must be sealed may have discontinuities of up to 0.050 inch (0.127 cm) due to tolerances resulting from the manufacture of the individual components in the stack and tolerances resulting from the assembly of the components.

From the foregoing, it is apparent that a seal material for this application must be compatible with phosphoric acid, be conformable to relatively large stack surface discontinuities, and have structural integrity, all at temperatures up to at least 400° F. (204° C.) for the life of the stack, which is desirably at least 40,000 hours. Also, the structural integrity or sealing ability must be maintained through numerous temperature cycles. Due to structural limitations of the stack and a desire to minimize the size, complexity and cost of stack hardware, it is also highly desirable that the seal material be able to effect a seal with low compressive forces.

No seal material on the market has been found to be completely suitable for this particular application. Elastomers such as ethylene-propylene rubber are suitable for use at temperatures below 325° F. (163° C.); however, at temperatures over 325° F. (163° C.), they are corroded by phosphoric acid to an unacceptable extent and they have been found to lose their elastomeric properties due to air oxidation at these higher temperatures. Polytetrafluoroethylene rope-type seal material presently on the market, such as Ready Seal by Chemplast, Inc., Wayne, N.J., is very stiff. For example, it was attempted to use this material as the manifold sealant in the aforementioned fuel cell application, but a satisfactory seal could not be effected even using sealing pressures between 450-500 pounds per linear inch of seal material. Grease compositions made with an oil base thickened with non-fibrillating polytetrafluoroethylene, such as described in U.S. Pat. No. 3,493,513, do not have sufficient strength to maintain seal integrity at high temperatures and throughout temperature cycling since the oil volatizes and weeps out, resulting in a drying out and cracking of this type of seal material.

Other attempts at making stable seal material for these purposes have included the addition of fillers such as graphite (U.S. Pat. No. 4,157,327) and filler plus halogenated oil (U.S. Pat. No. 4,028,324) to various fluorocarbon polymers. However, with all these compositions, seal integrity and stability at temperatures up to about 400° F. (204° C.) for long periods of time in the presence of phosphoric acid has been a problem.

Accordingly, what is needed in this art is a relatively simple composition which retains its seal properties for long periods of time at high temperatures and pressures in a corrosive chemical environment.

DISCLOSURE OF INVENTION

A seal material is described which is resistant to corrosive chemicals at temperatures in excess of 400° F. (204° C.) at differential pressures in excess of 50 psi comprising a high molecular weight unfilled, oil-free polytetrafluoroethylene having a particle size greater than 1 micron.

Another aspect of the invention comprises an electrochemical cell stack containing reactant gas plenums sealed with the above-described seal material.

The foregoing, and other features and advantages of the present invention, will become more apparent from the following description and accompanying drawing.

BEST MODE FOR CARRYING OUT THE INVENTION

Figure 1:
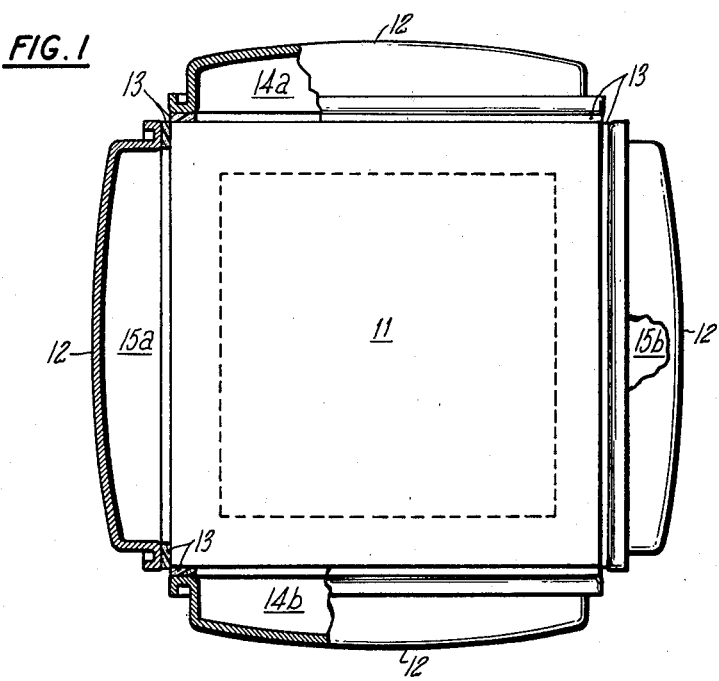
FIG. 1 is a top view of a fuel cell stack partly in section, partly broken away containing plenums sealed according to the present invention.

FIG. 1 is a top view of a fuel cell stack according to the present invention where 11 indicates the fuel cell stack generally comprising a stack of individual fuel cells having a total height of up to approximately 8 feet (2.4 meters). The dashed section of stack 11 indicates that portion of the stack sealed with powder filler or other seal material as described in U.S. Pat. No. 4,259,389. The plenums 12 which are used to introduce the reactant gases into the fuel cell stack are sealed to the stack by seal material 13. Plenum 14a in this Fig. represents the oxygen gas inlet and 14b the oxygen gas outlet. Plenum 15a represents the hydrogen gas inlet and 15b the hydrogen gas outlet. As can be seen from this Fig., it is very important that there be a good seal at area 13 to prevent premature gas mixing between the plenums.

Figure 2:
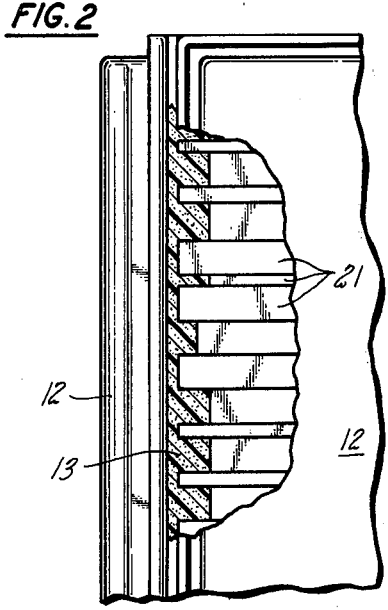
FIG. 2 is a side view partly in section, partly broken away of the edge of a fuel cell stack sealed according to the present invention.

FIG. 2 demonstrates the irregular edges which the seal material according to the present invention is particularly adapted to seal. In this Fig. which represents a side view of the stack 11 of FIG. 1, 21 represents the individual fuel cells, and 13 the seal material according to the present invention. As can be seen from this Fig., the seal material flows sufficiently to conform to the extremely irregular surfaces encountered in this arrangement. As in FIG. 1, 12 indicates the plenum.

The plenum is generally about 4 feet (1.2 meters) wide and about 8 feet (2.4 meters) tall with the flange section approximately 0.5 inch (1.3 cm) to 1 inch (2.5 cm) wide. The seal material is preferably applied in this arrangement at a thickness of at least approximately 0.120 inch (0.305 cm) and preferably 0.150 inch (0.381 cm) in a width at least equal to the area occupied by the flange section.

The key features of the improved seal material according to the present invention are seal integrity and stability at temperatures in excess of 400° F. (204° C.) for extended periods of time, for example 40,000 hours, at differential pressures in excess of 50 psi in phosphoric acid environment.

Corporation; Polymist F-5 by Davies Nitrate Co., Inc.; DLX-6000 by duPont de Nemours & Co.

TABLE

| Polymer Type | Particle Diameter (in microns) | Molecular Weight (number average) | Blow-out Pressure* (in PSI at 400° F.) | Leak Rate of Room Temperature** (in pounds per hour) |
|---|---|---|---|---|
| 7A | 35 | $20 \times 10^7$ | 57,76+ | 0.0020 |
| 7C | 30 | $3.6 \times 10^7$ | 62 | 0.0014 |
| G-700 | 20-35 | $>1 \times 10^6$ | — | 0.0014 |
| 6A | 500 ± 150 | $1.6 \times 10^6$ | 67 | 0.0031 |
| 6C | 500 ± 150 | $>1 \times 10^6$ | 62 | — |
| T1-126 | 6-25 | $2.1 \times 10^4$ | — | blow-out |
| F-5 | 5 | $<1 \times 10^6$ | — | >0.0128++ |
| T1-120 | <1-2 | $20-50 \times 10^4$ | — | blow-out |
| DLX-6000 | 0.20 | $4.3 \times 10^4$ | — | blow-out |

*under Carver press loading of 50 pounds per linear inch
**per linear inch of seal material measured under ten inches (monometer) nitrogen gas over-pressure
+two tests under identical conditions
++leak rates over .004 are unacceptable What is surprising about this invention is that for gas seal material in general, it has always been assumed that some filling of the polymeric pores was necessary for sealing because of the low molecular weight and therefore, high penetrating ability of, for example, hydrogen gas fuel reactant. Such pore filling was done with fillers, electrolyte or stable oils of low volatility. However, it has been found according to the present invention that if the molecular weight of the right polymer is high enough, such filling is not necessary. Polytetrafluoroethylene provides the stability properties necessary for this use and particle size in excess of 1 micron and molecular weights in excess of $1 \times 10^6$ (number average) provide these requisite sealing properties.

As described above, this material is used as a regular seal around the plenum separating the oxygen and hydrogen gas inlets. In the past, a low molecular weight fluorocarbon oil such as Krytox® (duPont de Nemours & Co.) was thought necessary to seal the Teflon pores in this environment. Note U.S. Pat. No. 4,028,324. Surprisingly, however, it has been found that the elimination of this oil and utilizing polytetrafluoroethylene of certain molecular weight and particle size ranges does not result in seal breakdown. As demonstrated in FIG. 1, the individual fuel cell components are generally sealed one from another to prevent premature gas mixing by means of wet seals, for example as described in U.S. Pat. No. 4,259,389. This sealing is generally at the corners or edges of the rectangular or square fuel cell components. The plenum flanges are preferably connected to the edges of the fuel cell stack coated with the seal material, although the seal material may be applied directly to the flanges of the plenum and the plenum then attached.

The following tests were performed to demonstrate the criticality of the selection of the polymer parameters for useful seal material according to the present invention. Note the Table where column 1 shows the various polymers tested; column 2, the particle diameters of these polymers; column 3, the number average molecular weight; column 4, the pressure at which the respective seal material failed; and column 5, seal leak rate. All materials tested were polytetrafluoroethylene (except for T1-120 which is a fluorinated ethylene-propylene polymer) with particle diameters and molecular weights as indicated. Polymers 6A, 6C, 7A and 7C are all manufactured by duPont de Nemours & Co.; T1-120 and T1-126 by Liquid Nitrogen Processing Corp. Engineering Plastics; Halon® G-700 by Allied Chemical In order to measure the leak rate and blow-out pressure in the Table, the following tests were performed. Graphite blocks approximately one inch (2.54 cm) thick were machined to produce irregularities simulating that encountered in the fuel cell stack. Note FIG. 2. The seal material was then applied to the irregular surfaces in thicknesses of about 0.125 inch (0.316 cm). A stainless steel plate approximately 0.25 inch (0.64 cm) thick was next placed against the seal material. To measure blow-out pressure the assembly was loaded by placing it between the platens of a Carver® Model B press (Fred S. Carver, Inc., Menomonee Falls, Wis.). The assembly was next platen heated to 400° F. (204° C.). Nitrogen gas was admitted to the assembly through a port in the side of the graphite block. The pressure was increased until hissing or blow-out was audibly and visibly evident. To measure leak rates, the same procedure was followed with bolts, tie rods and Belleville load maintaining washers used instead of the Carver press. Dynamic pressure conditions were imposed on the system in an oven heated to 400° F. (204° C.). Gas pressure was increased to 10 inches (25.4 cm) above atmospheric pressure measured on a monometer. At this point, the gas supply was shut off and rate of decrease of gas pressure measured on the monometer. The above tests have been found to provide a good indication of seal performance in a fuel cell stack.

From the Table, the importance of both molecular weight and particle size can be observed. For example, samples T1-120 and DLX-6000 with neither the requisite particle size nor molecular weight both failed to hold the requisite gas overpressure and blew out. And even T1-126, with the requisite particle size but not the requisite molecular weight, failed to hold pressure. The blow-out pressure is the differential pressure at which the seal material releases the gases being contained. Such release results in the deterioration of cell performance due to loss of reactant gas flow to the active catalyst area. By differential pressure is meant the measured pressure within the fuel cell stack minus the atmospheric pressure outside the stack.

It is also very important, as discussed above, that the seal material in this environment be acid resistant since, in a fuel cell stack, the phosphoric acid penetrates everywhere. The seal material, separating the hydrogen and oxygen whose close premature combination could be disastrous, is superior in this result. Other seal materials tested would not hold up under acid and would allow such combination.

It is preferred to apply the polytetrafluoroethylene as a caulk using water and a thickening agent such as Polyox ® by Union Carbide or Carbopol ® by Goodrich which are viscosity modifiers which will burn off or carbonize below the 400° F. (204° C.) use temperature. The thickeners are used in one or two percent solutions in water and the polymer added until a caulking consistency is attained. The composition is preferably applied from conventional caulking guns. The material can also be used in powder form in conjunction with a conventional spray booth-and-recovery system.

While silicon carbide can be mixed with the composition for certain high temperature sealing applications providing an improvement in mechanical properties, increased temperature resistance and reduced creep, in the acid environment necessary for the particular invention described above, it has a deleterious effect, picking up acid and forming electron conductive paths.

As seen from the Table, the preferred polytetrafluoroethylene is a fibrillar, high molecular weight Teflon ® sold commercially with a designation 7C by duPont de Nemours & Co. The fibrillar nature of the polymer causes it to mat when heated and/or compressed forming a better seal. While any polytetrafluoroethylene polymer with the requisite particle size, molecular weight and acid resistance may be used in the present invention (e.g. polymers 7A, 7C, G-700, 6A and 6C from the Table), this polymer (7C) has been found to be particularly suitable.

It had been expected that the material of the present invention would be porous, and therefore, in need of modifying oil because of its high viscosity. In fact, the art generally recognizes a relationship between viscosity and porosity with material of this type. It was also surprising that sealing properties were able to be affected with the use of the polymer alone since Teflon does not exhibit true liquid-like flow due to its high viscosity at high temperatures. In fact, there is a problem with utilizing this seal material upon decompression and recompression of the fuel cell stack and this lack of flow may account for the lack of sealing properties under such cycling.

While this invention has primarily been described for use with a phosphoric acid fuel cell system, it will be possible for one skilled in this art to utilize this material in similarly corrosive environments with similar temperature and pressure considerations. For example, this material can be used with other fuel cell electrolyte systems such as sulfuric acid, potassium hydroxide and perfluorosulfonic acid. Furthermore, the use of this material is not limited to a fuel cell stack, but has utility in industrial electrochemical cell stacks as well, such as in the production of sodium hydroxide, chlorine and the electrolysis of water.

Although this invention has been shown and described with respect to detailed embodiments thereof, it will be understood by those skilled in the art that various changes in form and detail thereof may be made without departing from the spirit and scope of the claimed invention.

We claim:

1. An electrochemical cell stack comprising a plurality of relatively flat electrochemical cells containing anodes, cathodes, electrolyte, and fuel and oxidant active catalysts, wherein fuel and oxidant gases are fed to or removed from the cell stack through plenums mounted on the cell stack, the improvement comprising sealing the plenums to the cell stacks by application between the plenum and the cell stack of an extrudable seal material comprising an oil-free, filler-free polytetrafluoroethylene which maintains its sealing properties in the presence of phosphoric acid at differential pressures in excess of 50 psi at temperatures in excess of 400° F. (204° C.) having a molecular weight greater than $1 \times 10^6$ and a particle size greater than 1 micron.

2. The electrochemical cell of claim 1 wherein the cell stack comprises phosphoric acid fuel cells.

3. The electrochemical cell stack of claim 2 wherein the seal thickness is at least 0.120 inch (0.305 cm).

* * * * *